United States Patent [19]

Brant et al.

[11] Patent Number: 5,212,001

[45] Date of Patent: May 18, 1993

[54] TACKIFIED ETHYLENE-ACRYLATE CLING LAYERS IN STRETCH/CLING FILMS

[75] Inventors: Patrick Brant, Seabrook; Paul M. German, Friendswood, both of Tex.

[73] Assignee: Exxon Chemical Patents Inc., Linden, N.J.

[21] Appl. No.: 918,475

[22] Filed: Jul. 22, 1992

Related U.S. Application Data

[60] Division of Ser. No. 633,524, Dec. 28, 1990, Pat. No. 5,154,981, which is a continuation-in-part of Ser. No. 123,002, Nov. 19, 1987, abandoned.

[51] Int. Cl.$^5$ .............................................. B65B 53/00
[52] U.S. Cl. ................... 428/34.9; 428/35.7; 229/3.5 R
[58] Field of Search .................... 428/516, 34.9, 35.7, 428/349; 229/3.5 R

[56] References Cited

U.S. PATENT DOCUMENTS 4,671,987  6/1987  Knott et al. .................. 428/516
5,013,595  5/1991  Parry ........................... 428/516

*Primary Examiner*—Edith Buffalow
*Attorney, Agent, or Firm*—T. Dean Simmons

[57] ABSTRACT

A thermoplastic film is provided which is especially suited for use in stretch/cling applications such as, for example, the bundling, packaging and unitizing of foods and other goods. The film comprises a cling layer comprising (i) a polymer of at least ethylene and acrylate or vinyl acetate, blended with (ii) a compatible, non-migratory tackifier. The film may further comprise a non-cling layer comprising a thermoplastic material essentially free of tackifier, with or without an anticling (slip and/or antiblock) additive. Preferred thermoplastic materials include linear low density polyethylene and polypropylene.

3 Claims, No Drawings

TACKIFIED ETHYLENE-ACRYLATE CLING LAYERS IN STRETCH/CLING FILMS

This is a division of application Ser. No. 633,524, filed Dec. 28, 1990 now U.S. Pat. No. 5,154,981, is a continuation-in-part of Ser. No. 123,002, filed Nov. 19, 1987, now abandoned.

FIELD OF THE INVENTION

The present invention relates generally to thermoplastic films and, more particularly, to thermoplastic films having properties making them especially well suited for use as stretch/cling wraps in various bundling, packaging and palletizing operations.

BACKGROUND OF THE INVENTION

Stretch/cling films have found utility in a wide variety of fields including the bundling and packaging of food and other goods. One application of particular, but not limiting, interest to the present invention is in the bundling of goods for shipping and storage such as, for example, the bundling of large rolls of carpet, fabric or the like for shipping from the manufacturer to a retail outlet. An important subset of these bundling applications is in the containment and unitizing of pallet loads.

The load of a pallet may be unitized or "bundled" by stretch-wrapping a film several times around the articles to be palletized. There exist a variety of stretch-wrapping techniques, two of which are commonly employed. In one technique, the loaded pallet is placed on a rotating turntable and the end of a continuous roll of film attached to the load. As the turntable rotates, the film is continuously wrapped around the pallet and load. Tension is applied to the film roll to cause the film to stretch as it is applied.

Because the film is in a stretched condition, it is placed under considerable tension and will have a tendency to return to its original, unstretched state. This tension can cause the film to unravel from the wrapped pallet, thereby jeopardizing the integrity of the unitized load. It is desirable, therefore, that the film have cling properties to prevent unraveling of the film from the pallet.

To impart cling properties to, or improve the cling properties of, a particular film, a number of well-known tackifying additives have been utilized. Common tackifying additives include polybutenes, terpene resins, alkali metal and glycerol stearates and oleates and hydrogenated rosins and rosin esters. The cling properties of a film can also be modified by the well-known physical process referred to as corona discharge.

The use of tackifying additives ordinarily is not desirable. While tackification is known in the art to enhance cling in an olefin cling film relative to an untackified film, this property improvement is not typically seen in the stretched film, and cling can become unsatisfactory when the film is stretched. Furthermore, lack of compatibility between film and tackifier resin may cause blending difficulties during film manufacture, adversely affect optical properties of the film and enhance surface migration of the additive. Such migration can damage the wrapped goods and has been known to cause the collapse and/or telescoping of rolls.

While "inner" surface cling in such film wraps is desirable, outer surface cling may be detrimental to the integrity of the load. Cling between adjacent wrapped pallets may cause tearing or puncturing of or other damage to the wrap as the pallets are transported. For this reason, it is desirable for the film to have slip or at least non-cling properties on its "outer" side to prevent this interpallet cling. Slip is defined in terms of coefficient of friction. In other words, it is desirable that the "outer" side of the film have a low coefficient of friction in contact with another object, particularly another like film. As with cling, slip can be imparted to the film or improved through the use of various well-known slip and/or antiblock additives including silicas, silicates, diatomaceous earths, talcs and various lubricants. Under highly stretched conditions, however, the coefficient of friction in the films tends to increase and even the slip additives may not provide the desired slip properties.

The tension in the stretched film may also cause the film to be more susceptible to punctures and tears. It is, therefore, also desirable for the film, as a whole, to have good stretch, tensile, puncture resistance and tear resistance properties.

Additionally, thermal stability of the various film components is important for the recycling of edge trim and film scrap generated in the various film production processes.

A wide variety of thermoplastic polymers such as, for example, polyvinyl chloride, polyethylene, polypropylene and various polymers of ethylene and other comonomers, most notably vinyl acetate, have been used as stretch/cling films. These materials standing alone, however, suffer from a number of shortcomings. Most cannot be stretched to a great extent without adversely affecting their slip, tensile, tear resistance and puncture resistance properties. For the particular case of ethylene-vinyl acetate polymers, thermal stability becomes a problem on the reprocessing of trim and scrap.

More recently, the use of multilayer films has gained popularity. With a multilayer film, one can obtain a stretch/cling wrap having cling properties on one side and slip properties on the other side. For example, U.S. Pat. No. 4,518,654 discloses a multilayer film having an A/B construction wherein the A side has cling characteristics and the B side has slip characteristics. In the aforementioned patent, the A side is said to comprise a polyethylene or an ethylene-monoolefin polymer, preferably linear low density polyethylene (LLDPE). To provide the LLDPE with the desired cling properties, a tackifying agent such as polyisobutylene (PIB), which migrates to the film surface or "blooms," is added to the polymer. The B side is said to comprise a low density polyethylene (LDPE) with an anticling additive added to impart the desired slip properties to the LDPE. This patent is hereby incorporated by reference herein for all purposes as if fully set forth.

Other multilayer films comprising layers of the various aforementioned stretch/cling materials are disclosed in U.S. Pat. Nos. 3,508,944, 3,748,962, 3,817,821, 4,022,646, 4,082,877, 4,147,827, 4,189,420, 4,194,039, 4,303,710, 4,399,180, 4,364,981, 4,418,114, 4,425,268, 4,436,788, 4,504,434, 4,588,650 and 4,671,987; U.K. Patent Application No. 2,123,747; French Patent No. 2,031,801; and European Patent Application No. 0,198,091, all of which are also incorporated by reference herein for all purposes. These multilayer films are generally produced by one of a number of well-known coextrusion processes also disclosed in the aforementioned incorporated references.

Many of the multilayer films, however, still suffer from shortcomings possessed by their individual layers.

For instance, most do not possess desired cling properties, and have reduced cling when in a highly stretched state. Others do not possess a desirable combination of stretch, tensile, tear resistance, puncture resistance, optical and thermal stability properties.

In European Patent Application No. 0,317,166 and previously mentioned U.S. Ser. No. 123,002, filed Nov. 19, 1987, both of which are hereby incorporated herein by reference, there is described a stretch/cling film having a cling layer of ethylene-acrylate copolymer. The film preferably avoids the use of a tackifying additive.

Hot melt adhesives, containing a blend of (a) high density polyethylene or isotactic polypropylene, (b) a copolymer of ethylene and an alkyl ester of acrylic or methacrylic acid or vinyl acetate, (c) an ionomer resin and (d) a tackifier such as a terpene resin or a glyceryl ester of a rosin acid, are described in U.S. Pat. Nos. 4,337,298 and 4,367,113 to Karim et al.

SUMMARY OF INVENTION

The present invention resides in part in the discovery of a tackified thermoplastic film having excellent cling properties which are, quite surprisingly, improved not only in an unstretched condition, but also in a stretched state. Broadly, the present invention provides a stretch/wrap thermoplastic film comprising a cling layer and a second polymer layer adjacent the cling layer. The cling layer consists essentially of (i) a polymer of two or more monomers, wherein a first monomer comprises ethylene and a second monomer comprises an acrylate or vinyl acetate, and (ii) a compatible tackifier blended therewith, wherein the blend has a glass transition temperature of about 0° C. or less. Miscibility of tackifier and polymer in the present invention surprisingly results in enhancement of cling properties in the highly stretched condition, rather than a substantial reduction in cling properties heretofore observed upon stretching the tackified stretch/cling films of the prior art. In addition, by careful selection of the tackifier, optical properties of the cling layer blend are not adversely affected.

The present invention further provides a multilayer stretch/cling film having excellent cling properties on one side and excellent slip properties on an opposite side, wherein the cling properties are enhanced in a stretched state as well as an unstretched state.

Still further, the present invention provides a multilayer stretch/cling film which, as a whole, possesses desirable stretch, tensile strength, puncture resistance, tear resistance, optical and thermal stability properties.

The present invention also provides a method for producing a thermoplastic film having a cling layer opposite a second layer. The method comprises the step of coextruding into a film a polymer-tackifier blend having cling properties as a cling layer, with a second layer. The blend consists essentially of (i) a polymer of two or more monomers, wherein a first monomer comprises ethylene and a second monomer comprises an acrylate or vinyl acetate, and (ii) a compatible tackifier blended therewith, wherein the blend has a glass transition temperature of about 0° C. or less.

Finally, the present invention provides a process for using such stretch/cling film to bundle, package or unitize an article or a plurality of articles, and an article or plurality of articles so bundled, packaged or unitized.

In accordance with the present invention, there is provided a thermoplastic film which comprises, in its overall concept, a cling layer comprising a polymer of two or more monomers and a compatible tackifier intimately blended therewith. A first monomer comprises ethylene and a second monomer comprises an acrylate or vinyl acetate. Such polymer shall generally be referred to as an ethyleneacrylate (or EA) polymer.

The blend preferably has sufficient cling for utility as the cling layer in a stretch/cling film. More particularly, the EA polymer preferably comprises an acrylate or vinyl acetate content of between about 20% to about 40%, more preferably above about 24%, most preferably above about 28%, by weight based upon the weight of the EA polymer. The tackifying additive preferably comprises from about 1% to about 30%, more preferably from about 5% to about 15%, by weight of the cling layer. The tackifier is preferably non-migratory, i.e. it is essentially retained in the cling layer, and when the second layer is a non-cling and/or core layer(s), such layer(s) is preferably essentially free of the tackifier.

The thermoplastic film may further comprise a second cling layer opposite the first cling layer, but preferably comprises a non-cling layer, more preferably a slip layer, opposite the cling layer, the non-cling or slip layer comprising any suitable thermoplastic material such as, for example, polyethylene (including high density, low density and linear low density polyethylenes), polypropylene, etc. Particularly preferred is polypropylene. The non-cling side should, of course, be essentially free of the tackifier from the cling layer so that the non-cling layer retains its non-cling characteristics. In addition, the non-cling side may include one or more well-known anticling (slip and/or antiblock) additives, but the non-cling layer is preferably essentially free of such anticling additives.

The thermoplastic film of the invention may be so constructed that a layer adjacent the first cling layer is a structural layer, and the second skin layer is positioned adjacent the structural layer. That is, the structural layer separates the first cling layer and the second layer. The second layer of the thermoplastic film may comprise a cling layer or a non-cling layer. In either case, the second layer may be a polyolefin. Preferably, when the second layer is a cling layer, it also comprises a blend of a polymer of 2 or more monomers and a compatible tackifier, wherein a first monomer comprises ethylene and a second monomer comprises an acrylate or vinyl acetate (EA). Where the third layer is a non-cling layer, it may include one or more of the well-known anticling (slip and/or antiblock) additives.

The structural layer of the thermoplastic films having more than 2 layers comprises about 5 to 95%, preferably at least about 50%, more preferably at least about 70–80% of the weight of the film. The structural layer may comprise a polyolefin of suitable makeup for the purpose to which the film is to be applied, such as, for example, linear low density polyethylene which is common for strength and optical properties in unitizing applications of stretch/cling films.

The thermoplastic film of the present invention may be produced utilizing any one of a number of well-known extrusion or coextrusion (in the case of multilayer films) equipment and processing conditions. In a multilayer film, the cling layer will preferably comprise from about 5% to about 95%, and the non-cling layer(s) will preferably comprise from about 95% to about 5%, of the total combined thickness of the film layers.

Thermoplastic films produced in accordance with the present invention have excellent cling properties on the cling layer and non-cling properties, preferably slip properties, on the non-cling layer. Particularly, the use of compatible, non-migrating tackifying additives can be utilized to impart enhanced cling properties even in a highly stretched condition while not adversely effecting slip properties of the non-cling layer. The present thermoplastic films, as a whole, additionally have desirable stretch, tensile, puncture resistance and tear resistance properties. Further, the thermoplastic compounds used for the cling and non-cling layers have excellent thermal stability, and edge trim scrap can be processed without significant loss of film performance. This combination of properties makes the thermoplastic films of the present invention especially well suited for use as stretch/cling wraps.

These and other features and advantages of the present invention will be more readily understood by those skilled in the art from reading the following detailed description.

DETAILED DESCRIPTION OF THE INVENTION

The present invention provides a thermoplastic film having a tackified cling layer wherein the cling is enhanced in both a highly stretched condition and an unstretched condition. That is, the cling layer of the film is "clingy" both before and after stretching, and can even become "clingier" when it is stretched. In addition, there is provided a thermoplastic film having excellent cling, slip, stretch, tensile, tear resistance, puncture resistance and thermal stability properties, making such film especially well suited for use as a stretch/cling wrap.

The thermoplastic film, in its overall concept, comprises a cling layer which comprises a polymer of two or more monomers and a compatible tackifier, wherein a first monomer comprises ethylene and a second monomer comprises an acrylate or vinyl acetate. Acrylate, in the singular, refers to both a single acrylate and combinations of different acrylates. These polymers will generally be referred to as ethylene-acrylate (or EA) polymers.

In the preferred embodiment, the EA polymer comprises an acrylate/acetate content of between about 20% to about 40%, more preferably above about 24%, most preferably above about 28%, by weight based upon the weight of the EA polymer. The EA polymer may have a wide range of melt indexes (MI), generally between about 0.1 to about 30, more preferably between about 1 to about 10 dg/min (ASTM D-1238, Condition E).

Preferred acrylates useful in the present invention are those of the general formula:

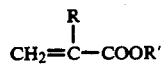

wherein R is selected from hydrogen or a hydrocarbon group having from 1 to 22 carbon atoms, preferably an alkyl, aryl, aromatic, or olefin of the like hydrocarbon group, and wherein R' is selected from the same or different of these hydrocarbon groups.

Preferred acrylates comprise those wherein R is selected from hydrogen or an alkyl group and wherein R' is the same or different such alkyl group. Specific examples of preferred acrylates include methyl acrylate, ethyl acrylate, propyl acrylate, n-butyl acrylate, 2-ethylhexyl acrylate, decyl acrylate, octadecyl acrylate, methyl methacrylate, ethyl methacrylate, n-butyl methacrylate and the like. Of these, methyl acrylate is particularly preferred, especially wherein the EA polymer has a methyl acrylate content of between about 24% to about 28% by weight of the EA polymer.

As previously indicated, the EA polymer can comprise more than two monomers with at least a first monomer comprising ethylene and a second monomer comprising one or more of the above-defined acrylates. For the case of teror additional monomers, suitable examples include, but are not limited to, other free radically polymerizable monomers such as, for example, acrylic acids (i.e. acrylic, methacrylic and ethacrylic acid), other acrylates, other vinyl esters, carbon monoxide and the like. These additional monomers will generally be present in small amounts, usually less than a total of about 10% by weight based upon the weight of the EA polymer.

In a preferred embodiment, the EA polymer has a narrow molecular weight distribution and a reduced incidence of long chain branching which have been found to enhance the cling properties of the cling layer containing the EA polymer. The narrow molecular weight distribution of the EA polymer is reflected by relatively low ratios of weight average molecular weight to number average molecular weight ($M_w/M_n$) and z average molecular weight to number average molecular weight ($M_z/M_w$). The ratio $M_w/M_n$ is preferably less than about 3.5, more preferably less than about 3, and especially less than about 2.5. The ratio $M_z/M_w$ is preferably less than about 3, more preferably less than about 2.6, and especially less than about 2.1. A reduction in long chain branching is generally reflected in a low melt index swell ratio, i.e., the ratio of the diameter of the melt indexer extrudate (ASTM D-1238, Condition E) to the diameter of the melt indexer orifice. The melt index swell ratio is preferably less than about 1.6, and more preferably less than about 1.5.

Films employing the preferred EA polymer as a cling layer have been found to have enhanced cling, and in particular, the cling of such films is not as adversely affected by stretching as similar films prepared from EA polymers having broader molecular weight distribution and/or more long chain branching. The film containing the EA polymer cling layer preferably has cling of the EA "inside" layer surface against the "outside" opposite layer surface (I/O cling) at 0% stretch of at least about 100 grams per inch (g), more preferably at least about 200 g, and especially at least about 250 g; and a 200% stretch I/O cling of at least about 90 g, and more preferably at least about 100 g as determined by the procedure described in the Examples hereinbelow. In addition, films prepared with the preferred EA polymer cling layer have enhanced optical properties such as, for example, less haze and more gloss, but retain comparable physical properties and processability.

The EA polymer may be produced by any one of a number of well-known processes such as, for example, those described in U.S. Pat. No. 3,350,372, which is incorporated by reference for all purposes as if fully set forth. Generally ethylene, acrylate and, if desired, another monomer(s) are metered into, for example, a high pressure autoclave reactor along with any one of a number of well-known free radical polymerization initiators (catalysts) suitable for producing EA polymers. Particularly preferred catalysts include organic peroxides such as, for example, lauroyl peroxide, di-tert butyl peroxide, tert butyl peroxide, tert butyl perpivilate and various azo compounds. Typically, the catalyst will be dissolved in a suitable organic liquid such as benzene, mineral oil, ISOPAR C. hydrocarbon solvent or the like. Ordinarily the catalyst is used at a level of between about 50 to about 20,000 ppm, more preferably between about 100 to about 250 ppm based upon the weight of the monomers.

The tackifier can be added to the EA polymer during or after the copolymerization reaction, or otherwise mixed in any manner obtaining an intimate blend therewith, to improve the cling properties of the film. A wide variety of tackifiers are known in the art including, for example, polyisobutylenes, atactic polypropylenes, terpene resins, aliphatic and aromatic hydrocarbon resins and the like. In aforementioned application U.S. Ser. No. 123,002, it was noted that the EA polymers can produce films of sufficient cling so as to not require the use of a tackifier, and that the use of such tackifiers was not desirable and preferably avoided. However, it has been discovered that the use of a compatible tackifier in accordance with the present invention can enhance the cling properties of EA polymers in a stretched condition so that cling can be, quite surprisingly, even more enhanced after stretching than before stretching. Moreover, the use of a compatible tackifier according to the present invention substantially avoids the disadvantages heretofore associated with the tackified cling polymers of the prior art, namely migration of the tackifier to the cling surface or into an opposed non-cling layer and problems caused by such tackifier migration.

The tackifier may be selected from a number of well known tackifiers such as, for example, rosin and its derivatives, and various hydrocarbon resins such as polyterpenes, polydienes, poly(vinyl aromatics) and the like, provided that the tackifier is compatible with the EA polymer, i.e. miscible therewith on a molecular scale under conditions of fabrication and use. In addition, the tackifier should be selected and used in such a proportion so as to obtain a cling layer of suitable characteristics. If an insufficient or excessive proportion of the tackifier is used, the cling properties of the cling layer may not be suitably enhanced. Also, if too much tackifier is employed, the physical properties of the cling layer can be adversely affected. Generally, the upper limit on the quantity of tackifier which can be employed depends in large part on the glass transition temperature of the tackifier and its compatibility with the cling layer EA polymer. The glass transition temperature of the cling layer blend should not exceed about 0° C., and is preferably in the range of from about −20° C. to about 0° C. to avoid excessive brittleness. The proportion of tackifier used desirably should not exceed any upper compatibility limit, if any, or result in a glass transition temperature of the blend which is too high so that the cling layer is undesirably brittle. The tackifier preferably comprises from about 1% to about 20%, preferably from about 5% to about 15%, by weight of the cling layer.

A preferred class of compatible tackifiers includes polar tackifiers having a glass transition temperature of from about −50° C. to about 50° C., preferably from about −10° C. to about 50° C. Preferred polar tackifiers include rosin esters and hydrogenated rosin esters having an acid number from 0 to about 15 such as, for example, the methyl, glycerol, pentaerythritol and like esters of rosin and hydrogenated rosin available under the trade designations FORAL, PENTALYN, ZON-ESTER, SYLVATAC, STAYBELITE, PEXALYN and the like. These tackifiers typically have a Ring & Ball softening point from about 80° C. to about 105° C. FORAL 105 tackifier, a glycerol ester of hydrogenated rosin having an acid number of about 12 and a Ring & Ball softening point of about 104° C., has been found to be particularly suitable.

Another preferred class of compatible tackifiers includes amorphous polymerized hydrocarbon resins which are liquids or semisolids at 25° C., preferably having a softening point of from about 10° C. to about 25° C. Preferred amorphous hydrocarbon tackifiers include polyterpenes available under the trade designations ZONAREX, ZONAREZ and PICCOLYTE; polymerized $C_5$ diolefins available under the trade designations WINGTACK and ESCOREZ; poly(vinyl aromatics) available under the trade designations REGALREZ, NEVILLAC, PICCOLASTIC and KRISTALEX; and the like.

Specific representative examples of hydrocarbon tackifiers compatible with EMA cling polymers containing 24 weight percent methyl acrylate include ZONAREZ A25, a polymer made by Arizona Chemical from terpene hydrocarbons having a softening point of about 25° C.; REGALREZ 1018, a hydrogenated styrene-based polymer, made by Hercules, having a softening point of about 18° C.; WINGTACK 10, a polymer made by Goodyear from terpenes, having a softening point of about 10° C.; ESCOREZ 2520, a polymer made by Exxon Chemical from $C_5$ diolefins and other reactive diolefins, having a softening point of about 20° C.; and the like.

The EA polymer/tackifier blend may, if desired, also include one or more other well-known additives such as, for example, antioxidants, ultraviolet absorbers, antistatic agents, release agents, pigments, colorants or the like; however, this should not be considered a limitation of the present invention. The cling layer blend should, however, be essentially free of incompatible additives and other ingredients in such quantities as would substantially impair the cling or other advantageous properties of the blend.

The film of the present invention may further comprise a second cling layer opposite this first cling layer, but preferably further comprises a non-cling layer opposite the cling layer, with the non-cling layer preferably comprising any suitable polyolefin or combination of polyolefins such as polyethylene, polypropylene, copolymers of ethylene and propylene, and polymers obtained from ethylene and/or propylene copolymerized with minor amounts of other olefins, particularly $C_4$–$C_{12}$ olefins. Particularly preferred is polypropylene. Suitable polypropylene is normally solid and isotactic, i.e., greater than 90% hot heptane insolubles, having wide ranging melt flow rates (MFR) of from about 0.1 to about 300 dg/min. As is known, such polypropylene is normally crystalline with a density range of from about 0.89 to about 0.91 g/cc for isotactic polypropylene. Such polypropylene and methods for making the same are well-known in the art, and they are readily available commercially. Employing polypropylene in the non-cling layer has the added advantage of imparting abrasion resistance thereto.

Also suitable is linear low density polyethylene (LLDPE), i.e., a copolymer of ethylene with up to about 20% by weight $C_3$–$C_{10}$ olefin(s). Especially preferred olefins include 1-butene, 1-hexene, 1-octene and 4-methylpentene-1. Suitable LLDPEs include those having a density greater than about 0.900 g/cc, more preferably in the range of from about 0.900 to about 0.940 g/cc. The LLDPEs may also have a wide ranging MI, generally up to about 30 dg/min, preferably between about 0.5 to about 10 dg/min. Such LLDPEs and methods for making the same are well-known in the art, and they are readily available commercially.

Additionally, the non-cling layer may include one or more anticling (slip and/or antiblock) additives which may be added during or after the production of the polyolefin, or otherwise mixed in any manner obtaining an intimate blend therewith, to improve the slip properties of this layer. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm by weight based upon the weight of the non-cling layer.

The non-cling layer may, if desired, also include one or more other well-known additives such as, for example, antioxidants, ultraviolet absorbers, antistatic agents, release agents, pigments, colorants or the like; however, this again should not be considered as a limitation of the present invention.

Additionally, normal trim and scrap from the film production process can be recycled into either the cling or non-cling layers, but preferentially to the non-cling layer of a two-layer film or the core structural layer of a three-layer film.

The present invention may also include one or more intermediate layers between the cling and non-cling layers for any one of a number of well-known purposes such as, for example, to modify the overall physical properties balance of the film, to utilize the recycle trim and scrap or to provide a barrier layer to oxygen or other gases. As just indicated, this intermediate layer may include the recycle trim and scrap, or may comprise any other suitable polymer. The intermediate layer(s), however, is optional and should not be considered a limitation on the present invention.

In preparing the thermoplastic stretch/cling films of the present invention, any one of a number of well-known extrusion or coextrusion (in the case of multilayer films) techniques as disclosed in the previously incorporated references may be utilized. As preferred examples, any of the blown or chill roll cast processes as disclosed and described in those references is suitable for use in producing thermoplastic stretch/cling films in accordance with the present invention.

In a multilayer film, the cling layer preferably comprises between about 5% to about 95%, more preferably between about 5% to about 35%, most preferably between about 5% to about 15% of the combined thickness of the film layers. Conversely, the non-cling layer(s) (including any structural or other intermediate layer) preferably comprises between about 5% to about 95%, more preferably between about 65% to about 95%, most preferably between about 85% to about 95% of the combined thickness of the film layers.

As previously mentioned, the thermoplastic films of the present invention have properties making them especially well suited for use as stretch/cling films, however this use should not be considered a limitation on the present invention. For example, these films can be made into other forms, such as a tape, by any one of a number of well-known cutting, slitting and/or rewinding operations. Physical properties including, but not limited to, tensile strength, tear strength and elongation can be adjusted over wide ranges by altering the resin types and specifications as appropriate to meet the requirements to a given wrapping, bundling or taping application.

For bundling, packaging and unitizing applications, the thermoplastic film of the present invention is stretch-wrapped by any one of a number of well-known procedures (such as those disclosed in the aforementioned incorporated references) around an article or a plurality of articles preferably so that the cling layer faces inside (towards the article) and the non-cling layer faces outside (away from the article), although this film orientation should not be considered as a limitation on the invention. Typical of articles suitable for bundling, packaging and unitizing with the present thermoplastic film include, but are not limited to, various foodstuffs (canned or fresh), rolls of carpet, liquid containers and various like goods normally containerized and/or palletized for shipping, storage and/or display.

The foregoing more general discussion of this invention will be further exemplified by the following specific examples offered by way of illustration and not limitation of the above-described invention.

EXAMPLES

In the following examples, property evaluations were made in accordance with the following tests:
(1) Coefficient of Friction (COF)—ASTM D—1894.
(2) Cling—cling is reported as the force in grams required to partially peel apart two strips of film. A first film strip is attached to a 30° inclined plane with the outside surface (slip) facing upward. A second 1"×8" strip is placed on top of the first strip with the inside surface (cling) facing downward. Pressure is applied to the second strip to cause the two strips to stick together. If an evaluation of cling under stretched conditions is desired, both film strips are prestretched and allowed to relax before testing. The end of the second strip at the base of the inclined plane is attached, by clip and string, to an apparatus which can exert a strain at a constant rate (Instron 1130). The two strips are then pulled apart at a crosshead speed of 10 cm/min until the aforementioned string is parallel with the base of the inclined plane. The force at this point is reported as cling.

EXAMPLES 1-4

An ethylene-methyl acrylate (EMA) copolymer, having a methyl acrylate content of 24 weight percent and a MI of 5 dg/min, was blended with FORAL 105 tackifier in a proportion ranging from 0 to 15 weight percent. The EMA/FORAL blends were coextruded with a polypropylene (PP) having a melt flow rate (MFR) of about 12 dg/min (commercially available from Exxon Chemical Company, Houston, Texas, under the trade designation PP-3014). Slip (Kememide E, a commercial erucamide available from Humko Chemical Company, Memphis, Tenn.) and antiblock (AB) (Super Floss ™ a commercial silica available from Johns Manville) were added to the PP. Other properties of the EMA, FORAL 105, EMA/FORAL blends and PP are listed below in Table I.

The EMA copolymer and FORAL 105 tackifier were blended on a Banbury mixer and pelletized on a Davis Standard Thermatics at a melt temperature of about 350° F. under nitrogen blanket. The film was produced by coextruding the EMA copolymer/FORAL 105 tackifier blend and PP-3014 on a Killion cast film line with two ⅜" extruders, respectively, for the EMA blend and PP layers. The EMA blend was extruded at a melt temperature of about 410° F., while the PP was extruded at a melt temperature of about 480° F. The chill roll temperature was set to 80° F. and the line speed averaged about 30 feet per minute.

The resulting film had a gauge of 1 mil with the EMA blend layer comprising about 20% of the total film thickness. The 0/0 slip (the PP layer surface against the PP layer surface) was then measured as the coefficient of friction (COF) for 0%, 100% and 200% stretch, and I/O cling (EMA/PP) results are presented below in Table I.

TABLE I

| EXAMPLE | CLING LAYER COMPOSITION (wt. %) | | CLING (g)[1] | | |
|---|---|---|---|---|---|
| | EMA | FORAL 105 | 0% Stretch | 100% Stretch | 200% Stretch |
| 1 | 100 | 0 | 150 | 80 | 60 |
| 2 | 95 | 5 | 250 | 150 | 170 |
| 3 | 90 | 10 | 288 | 246 | 268 |
| 4 | 85 | 15 | 595 | n/a | 688 |

[1]EMA to PP layer surfaces
n/a = data not available

The foregoing results show that films in accordance with the present invention exhibited enhanced cling properties upon stretching, and otherwise had good physical properties, extrusion processability and utility appropriate for stretch/cling wrap applications. The results further suggest the ability to tailor film cling and slip properties and balance properties by altering variables including the EA polymer comonomer content, tackifier content, resin type(s) of the non-cling layer, slip additive content of the non-cling layer and antiblock additive content of the non-cling layer.

The films of the invention may also be used in surface protection applications. Especially at high acrylate content, viz, above about 24% methyl acrylate in the EA polymer, the films are very effective in the temporary protection of surface during manufacturing, transportation, etc. The easily coextruded films of the invention are also often less expensive than known surface protection films of, e.g., LLDPE and acrylic layers. Advantageously, the films of the invention do not leave significant adhesive traces on the surface to be protected and have good UV stability.

Many modifications and variations besides the embodiments specifically mentioned may be made in the compositions and method described herein without substantially departing from the concept of the present invention. Accordingly, it should be clearly understood that the form of the invention described herein is exemplary only, and is not intended as a limitation of the scope thereof.

What is claimed is:

1. A method for bundling, packaging or unitizing an article or a plurality of articles, comprising the step of:
    stretch-wrapping a stretch/wrap thermoplastic film, comprising a cling layer consisting essentially of (i) a polymer of two or more monomers, wherein a first monomer comprises ethylene and a second monomer comprises an acrylate or vinyl acetate, and (ii) a compatible tackifier blended therewith, said polymer/tackifier blend having a glass transition temperature of about 0° C. or less; and a second layer adjacent to said cling layer around the article or articles.

2. A bundled, packaged or unitized article or plurality of articles, comprising:
    the article or plurality of articles having a stretch/wrap thermoplastic film, comprising a cling layer consisting essentially of (i) a polymer of two or more monomers, wherein a first monomer comprises ethylene and a second monomer comprises an acrylate or vinyl acetate, and (ii) a compatible tackifier blended therewith, said polymer/tackifier blend having a glass transition temperature of about 0° C. or less; and a second layer adjacent to said cling layer stretch-wrapped around said article or plurality of articles.

3. A method for the surface protection of an article, comprising the step of:
    covering the surface to be protected on the article with a stretch/wrap thermoplastic film, comprising a cling layer consisting essentially of (i) a polymer of two or more monomers, wherein a first monomer comprises ethylene and a second monomer comprises an acrylate or vinyl acetate, and (ii) a compatible tackifier blended therewith, said polymer/tackifier blend having a glass transition temperature of about 0° C. or less; and a second layer adjacent to said cling layer.

* * * * *